(12) United States Patent
Park

(10) Patent No.: US 9,481,084 B2
(45) Date of Patent: Nov. 1, 2016

(54) TOUCH QUALITY TEST ROBOT

(75) Inventor: Young Bu Park, Seoul (KR)

(73) Assignee: Microsoft Technology Licensing, LLC, Redmond, WA (US)

(*) Notice: Subject to any disclaimer, the term of this patent is extended or adjusted under 35 U.S.C. 154(b) by 18 days.

(21) Appl. No.: 13/530,692

(22) Filed: Jun. 22, 2012

(65) Prior Publication Data

US 2013/0345864 A1  Dec. 26, 2013

(51) Int. Cl.
| | |
|---|---|
| *G05B 19/418* | (2006.01) |
| *B25J 9/16* | (2006.01) |
| *B25J 9/00* | (2006.01) |
| *B25J 9/02* | (2006.01) |
| *B25J 13/08* | (2006.01) |
| *G06F 11/22* | (2006.01) |

(52) U.S. Cl.
CPC .............. *B25J 9/1612* (2013.01); *B25J 9/0084* (2013.01); *B25J 9/023* (2013.01); *B25J 9/1682* (2013.01); *B25J 13/081* (2013.01); *G06F 11/2221* (2013.01); *G05B 2219/39488* (2013.01); *G05B 2219/39497* (2013.01); *G05B 2219/39498* (2013.01); *G05B 2219/40041* (2013.01); *G05B 2219/40293* (2013.01); *G05B 2219/45089* (2013.01)

(58) Field of Classification Search
CPC .................. G05B 19/418; G05B 2219/39488; G05B 2219/39497; G05B 2219/39498; G05B 2219/40041; G05B 2219/40293; G05B 2219/45089; B25J 9/16; B25J 15/08; B25J 13/081; B25J 9/0084; B25J 9/023; B25J 9/1612; B25J 9/1682; G06F 3/041; G06F 11/2221
USPC ...... 700/245–264; 901/14, 49; 345/178, 174
See application file for complete search history.

(56) References Cited

U.S. PATENT DOCUMENTS

| | | | | |
|---|---|---|---|---|
| 6,008,636 | A  | * 12/1999 | Miller et al. | .............. 324/757.01 |
| 7,489,303 | B1 | *  2/2009 | Pryor | ............................. 345/173 |
| 8,061,223 | B2 |   11/2011 | Pan | |
| 2006/0227120 | A1 | * 10/2006 | Eikman | ......................... 345/175 |
| 2008/0252616 | A1 | * 10/2008 | Chen | ............................ 345/175 |

(Continued)

FOREIGN PATENT DOCUMENTS

WO  2013063042 A1  5/2013

OTHER PUBLICATIONS

Hoffmann et al. "Biologically-inspired dynamical systems for movement generation: automatic real-time goal adaptation and obstacle avoidance", May 2009, IEEE.*

(Continued)

*Primary Examiner* — Jerrah Edwards
*Assistant Examiner* — Rachid Bendidi
(74) *Attorney, Agent, or Firm* — Timothy Churna; Dan Choi; Micky Minhas

(57) ABSTRACT

Described herein is a robot for testing touch-sensitive displays. The test robot may have a test surface holding a touch-sensitive display. The test robot may also have a first robotic unit that can translate in only two dimensions relative to the touch-sensitive display, where the first robotic unit secures a first plurality of finger units. The test robot may also have a second robotic unit that can translate in only the two dimensions relative to the touch-sensitive display, where the second robotic unit secures a second plurality of finger units. The test robot may also have a control unit controlling the first robotic unit, the second robotic unit, the first plurality of finger units, and the second plurality of finger units.

16 Claims, 20 Drawing Sheets

(56) References Cited

U.S. PATENT DOCUMENTS

| | | | |
|---|---|---|---|
| 2009/0241701 A1* | 10/2009 | Pan | G06F 3/041 73/865.9 |
| 2009/0312009 A1 | 12/2009 | Fishel | |
| 2012/0065779 A1* | 3/2012 | Yamaguchi et al. | 700/259 |
| 2012/0065780 A1* | 3/2012 | Yamaguchi et al. | 700/259 |
| 2012/0146956 A1* | 6/2012 | Jenkinson | 345/178 |
| 2012/0153652 A1* | 6/2012 | Yamaguchi et al. | 294/86.4 |
| 2012/0191394 A1* | 7/2012 | Uzelac et al. | 702/79 |
| 2012/0223894 A1* | 9/2012 | Zhao et al. | 345/173 |
| 2012/0266021 A1* | 10/2012 | Tian | G06F 11/2733 714/27 |
| 2012/0280934 A1* | 11/2012 | Ha | G06F 11/2221 345/174 |
| 2012/0280946 A1* | 11/2012 | Shih et al. | 345/178 |
| 2013/0046611 A1* | 2/2013 | Bowles | G06Q 10/00 705/14.37 |
| 2013/0238129 A1* | 9/2013 | Rose et al. | 700/258 |

OTHER PUBLICATIONS

Prokopiou, Platon. International Search Report. Sep. 27, 2013. PCT/US2013/046208.

Kjellgren, Olof, "Developing a Remote Control Application for Windows CE", Retrieved at <<http://www.idt.mdh.se/utbildning/exjobb/files/TR0661.pdf>>, May 30, 2007, pp. 43.

Hoshino, et al., "Pinching at Finger Tips for Humanoid Robot Hand", Retrieved at <<http://web.mit.edu/zoz/Public/HoshinoKawabuchiRobotHand.pdf>>, CIRA, Jun. 30, 2005, pp. 09.

Brodkin, Jon, "Windows 8 Hardware: Touchscreens, Sensor Support and Robotic Fingers", Retrieved at <<http://arstechnica.com/business/news/2011/09/windows-8-hardware-touch-screens-sensor-support-and-robotic-fingers.ars>>, Sep. 13, 2011, p. 01.

Buffet, Y. "Robot Touchscreen Analysis", Retrieved at <<http://ybuffet.posterous.com/labsmotocom-blog-archive-robot-touch-screen-an>>, Apr. 19, 2010, pp. 02.

McGlaun, Shane, "Microsoft's Surface 2.0 Stress Testing Robot Called Patty Shown off for First Time", Retrieved at <<http://www.slashgear.com/microsofts-surface-2-0-stress-testing-robot-called-patty-shown-off-for-first-time-19172971/>>, Aug. 19, 2011, p. 01.

Takeuchi, et al., "Development of a Multi-fingered Robot Hand with Softness-changeable Skin Mechanism", Retrieved at <<http://ieeexplore.ieee.org/stamp/stamp.jsp?arnumber=05756853>>, Robotics (ISR), 2010 41st International Symposium on and 2010 6th German Conference on Robotics (ROBOTIK), Jun. 7-9, 2010, pp. 1-7.

\* cited by examiner ns such as
TOUCH QUALITY TEST ROBOT

BACKGROUND

With increasing use of touch-sensitive devices such as smart phones, tablets, laptops, and others, there has been increasing need to test such touch-sensitive devices. For example, it may be desirable to verify physical attributes of a touch-sensitive device, such as sensitivity and accuracy. In addition, it may be desirable to test the correctness of software running on a touch-sensitive device using physical test inputs to interact with software being tested. With regard to testing physical traits of a touch-sensitive device, to test for compliance with a certification standard, for example, human testers generally cannot duplicate their test behaviors on diverse target devices to equally measure the same physical qualities of different devices. The test results of touch devices have been judged with an individual's subjectivities and without specific criteria. Furthermore, human finger methodology is prone to inconsistency due to variables in finger pressure, line-straightness, tracing speed, etc.

Techniques and devices related to robotic testing of touch-sensitive devices are described below.

SUMMARY

The following summary is included only to introduce some concepts discussed in the Detailed Description below. This summary is not comprehensive and is not intended to delineate the scope of the claimed subject matter, which is set forth by the claims presented at the end.

Described herein is a robot for testing touch-sensitive displays. The test robot may have a test surface holding a touch-sensitive display. The test robot may also have a first robotic unit that can translate in only two dimensions relative to the touch-sensitive display, where the first robotic unit secures a first plurality of finger units. The test robot may also have a second robotic unit that can translate in only the two dimensions relative to the touch-sensitive display, where the second robotic unit secures a second plurality of finger units. The test robot may also have a control unit controlling the first robotic unit, the second robotic unit, the first plurality of finger units, and the second plurality of finger units.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to techniques and devices for robotic testing of touch-sensitive devices. Various mechanical details of a test robot will be discussed, followed by discussion of a software framework for using test robots to test touch-sensitive devices.

Figure 1:
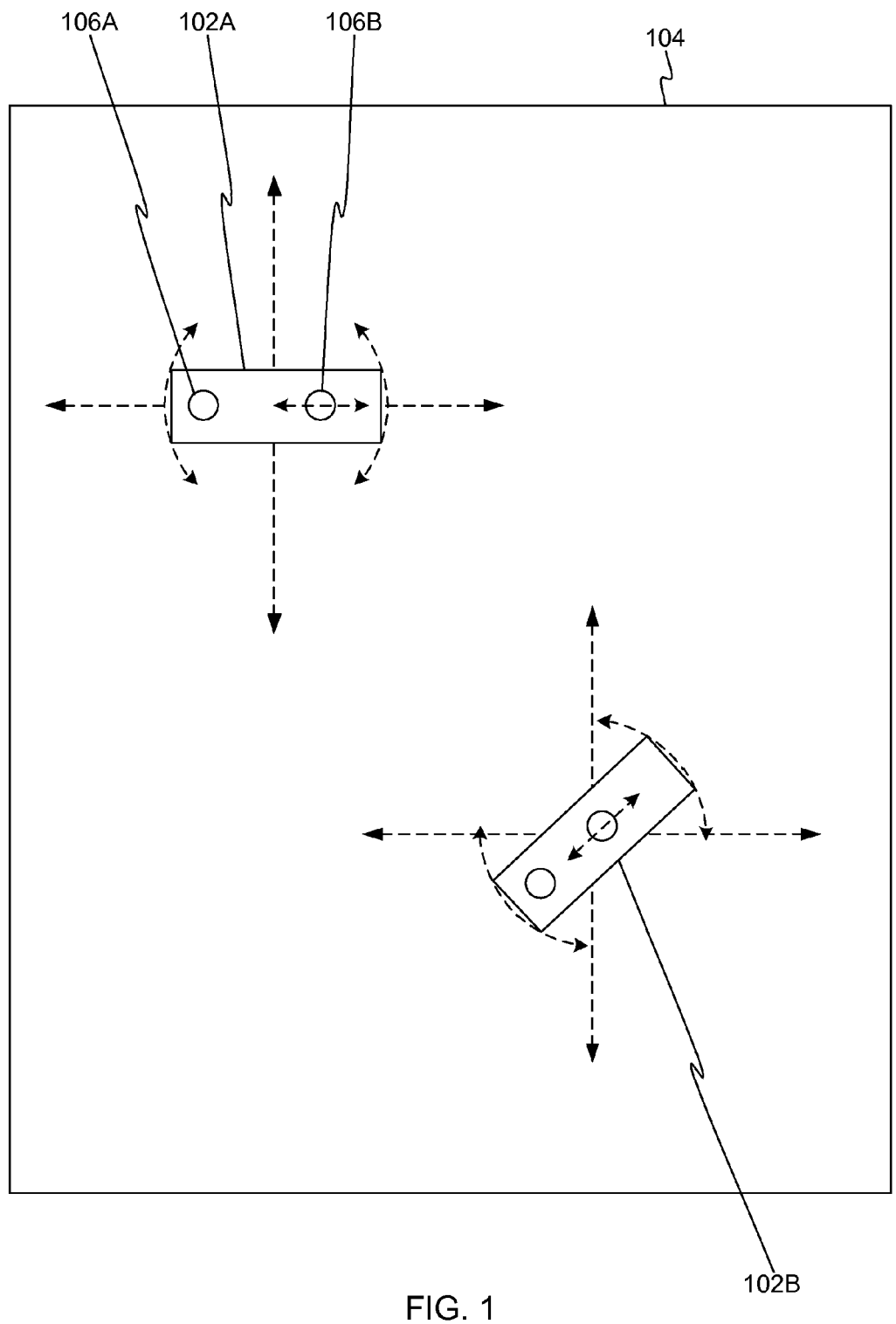
FIG. 1 shows an overhead of robotic hands and a touch-sensitive device.

FIG. 1 shows an overhead of robotic hands 102A, 102B and a touch-sensitive device 104. Robotic hands 102A and 102B have similar construction and control; the following description of the robotic hand 102A will describe parallel features of the robotic hand 102B. FIG. 1, an overhead view, may be thought of as a reference plane (i.e., an x-y plane), with various robot elements moving in x-y directions parallel to the reference plane. The robotic hand 102A moves in x-y directions above a touch device 104.

The robotic hand 102A has two or more finger units 106A, 106B. The finger units 106A 106B naturally move as the robotic hand 102A to which they are attached moves. If a finger unit 106A, 106B is contacting the touch device 104, the finger unit 106A 106B will trace a path on the surface of the touch device 104 that corresponds to a translation path of the robotic hand 102A in a plane parallel to the reference plane. The finger units 106A, 106B are designed to move in a direction substantially perpendicular to the reference plane (e.g., up and down if the touch device 104 is lying flat), thus allowing them to be individually arranged such that one finger unit 106A may be contacting the touch device 104 (e.g., down) while the other finger unit 106B is not contacting the touch device 104 (e.g., up).

One or more of the finger units, for example finger unit 106B, may translate relative to the robotic hand 102A in a direction parallel to the reference plane. For example, the robotic hand 102A may have a rail that is parallel to the reference plane, and the finger unit 106B may be movably mounted on the rail, thus allowing the finger unit 106B to be translated by a dedicated servo along the rail in a direction parallel to the reference plane (as indicated by the dashed arrow on the finger unit 106B). If the finger unit 106B is contacting the touch device 104, the finger unit 106B's translation relative to the robotic hand 102A causes the finger unit to trace a corresponding contact path on the surface of the touch device 104.

As indicated by the dashed arcs in FIG. 1, the robotic hand 102A may also be configured to rotate in a plane parallel to the reference plane (parallel to the surface of the touch device 104), thereby causing any finger units that are contacting the surface of the touch device 104 to trace a circular or arced path, according to possible additional translation of the robotic hand 102A and/or translation of a finger unit 106A, 106B relative to the robotic hand 102A. In sum, it is possible that a finger unit 106A, 106B, at any given time, may be (i) translating perpendicular to the reference plane (e.g., the touch device 104 or a surface holding same), thus allowing the finger unit 106A, 106B to move into or out of contact with the touch device 104, (ii) translating parallel to the reference plane according to translation of the robotic hand 102A, and (iii) translating parallel to the reference plane according to rotation of the robotic hand 102A.

Figure 2:
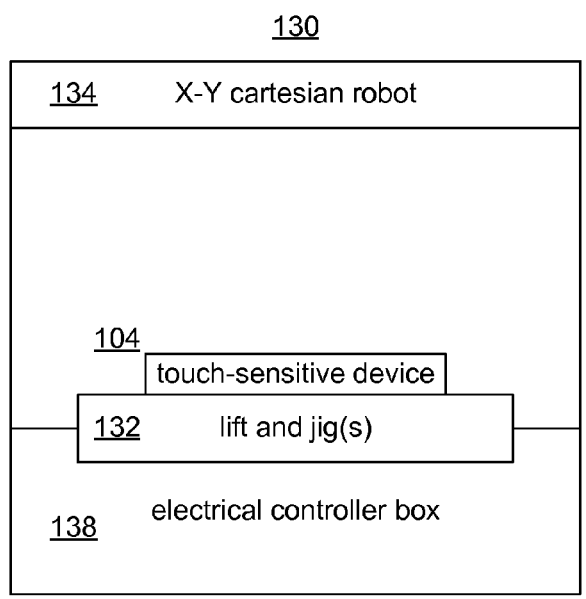
FIG. 2 shows a side view of a test robot.

FIG. 2 shows a side view of a test robot 130. A test surface 132 may include one or more lifts and jigs to hold the touch device 104. The test surface 132 may be thought of as a reference plane that is perpendicular to FIG. 2. An X-Y Cartesian robot 134 provides movement of one or two of the robotic hands 102A, 102B in directions parallel to the test surface 132. For an example, see arm unit 136A in FIG. 3. An electrical controller box 138 may house various control components discussed later, such as control circuits, power supplies, communications buses, etc.

Figure 3:
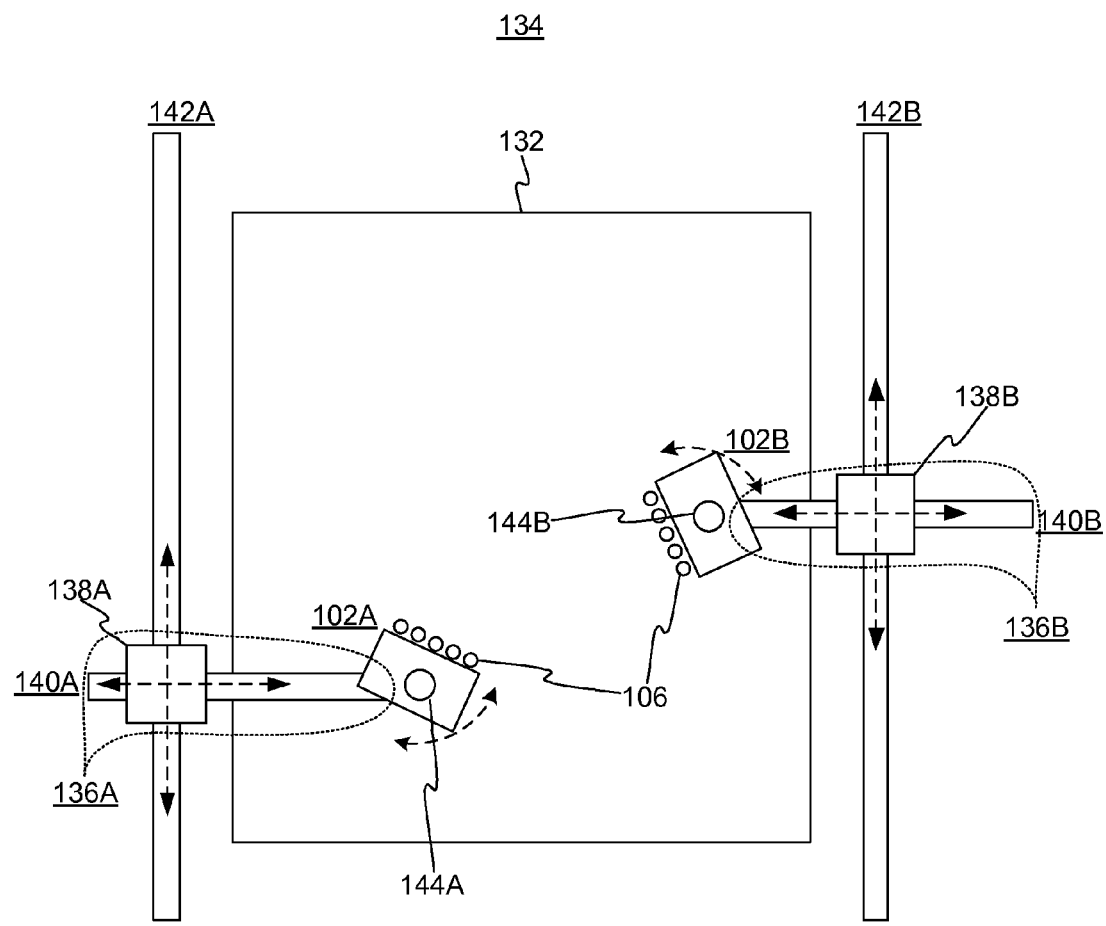
FIG. 3 shows a detailed overhead view of a test robot, in particular an X-Y Cartesian robot.

FIG. 3 shows a detailed overhead view of test robot 130, in particular X-Y Cartesian robot 134. In the embodiment shown in FIG. 3, robotic hands 102A, 102B each have five finger units 106 (106A/106B), one or more of which may move relative to robotic hands 102A, 102B as described above in reference to FIG. 1. The robotic hands 102A, 102B may be moved laterally in a plane parallel to test surface 132 (e.g., a reference plane). The X-Y movement of robotic hands may be provided by arm units 136A, 136B. An arm unit 136A, 136B may have a motorized movement unit 138A, 138B, which moves an arm 140A, 140B in the X direction by moving the arm 140A, 140B in the direction of its length, and in the Y direction by the movement unit 138A, 138B moving itself along a beam 142A, 142B. In addition, the robotic hands 102A, 102B may be rotated by servos 144A, 144B.

The rotational and translational movement of the robotic hands 102A, 102B may be implemented by a variety of known mechanical techniques, including, for example, servos moving gears engaging toothed rails, servos driving belts, rotating threaded rods (i.e., ball screws), chains, etc. Moreover, other arrangements may be used. For example, rather than the movement unit 140A, 140B actually moving, the movement unit 140A, 140B, may have a servo that rotates to move the arm 140A, 140B in sweeping motions, in which case the movement unit 140A, 140B may also have another servo that moves the arm 140A, 140B toward and away from the movement unit 140A, 140B (i.e., along the length of the arm 140A, 140B). Other designs may be used, including reticulated arms, a single movement unit moving two attached arms, etc.

Figure 4:
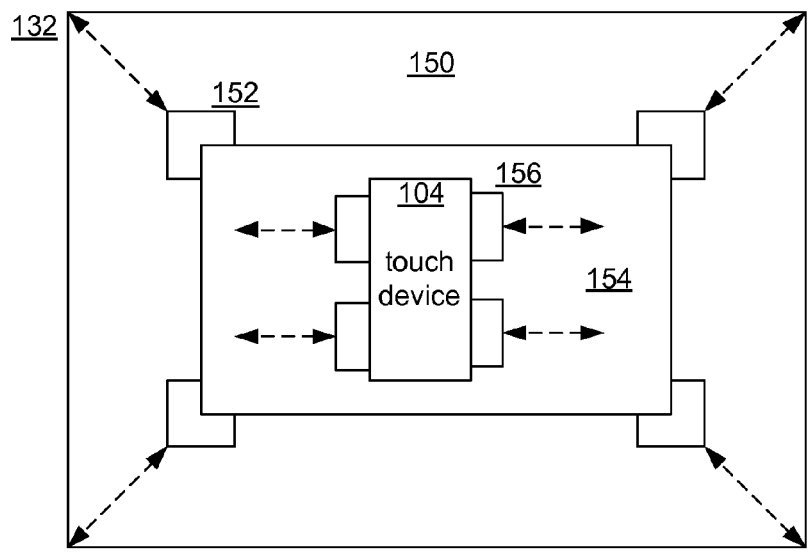
FIG. 4 shows a test surface.
Figure 4:
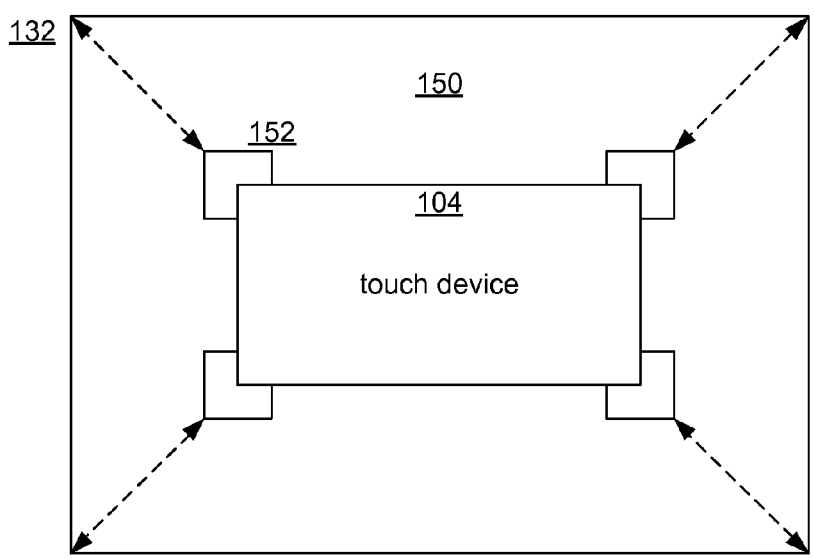

FIG. 4 shows test surface 132. In an embodiment shown in the upper part of FIG. 4, a first jig 150, with first moveable holders 152, holds a second jig 154. The second jig 154 has second moveable holders 156. The first moveable holders 152 are adjusted to hold the second jig 154, and the second moveable holders 156 are adjusted to hold the test device 104. In embodiment shown in the lower part of FIG. 4, the second jig 154 has been removed and a larger touch device 104 is held directly by first moveable holders 152.

Figure 5:
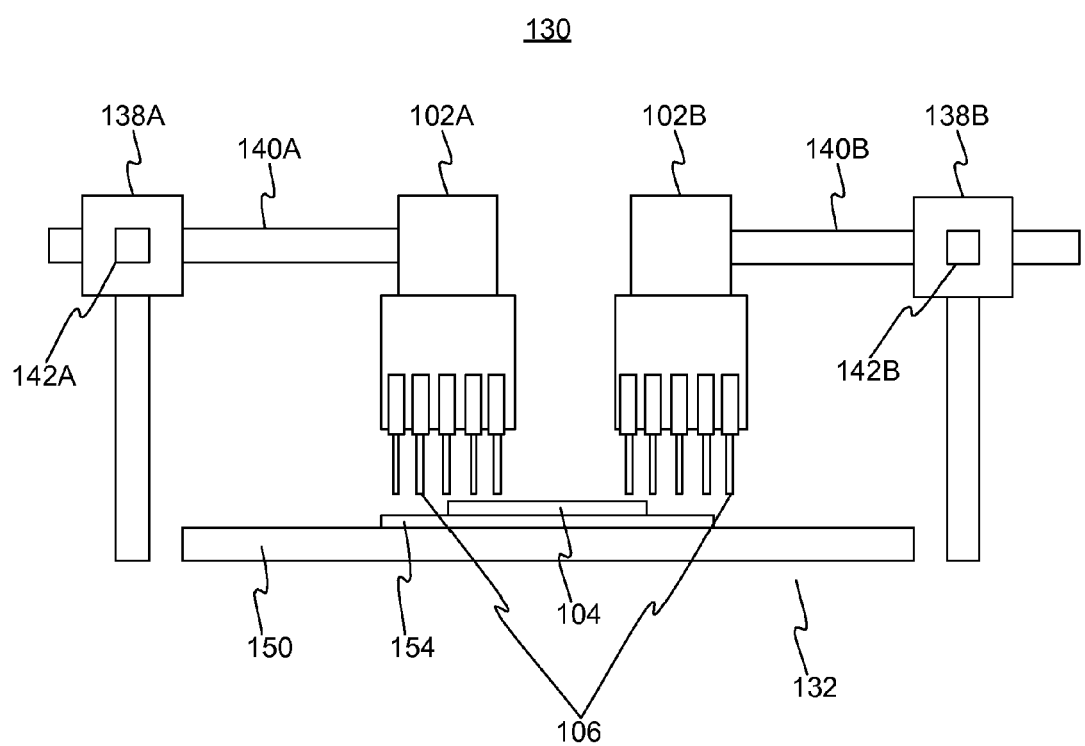
FIG. 5 shows a side view of a test robot.

FIG. 5 shows a side view of test robot 130. In FIG. 5, test surface 132 is a planar surface perpendicular to the figure. Relative to the figure, the arms 140A, 140B move to the left and the right, and the movement units 138A, 138B move perpendicular to the figure. Each type of movement causes corresponding movement of the robotic hands 102A, 102B.

Figure 6:
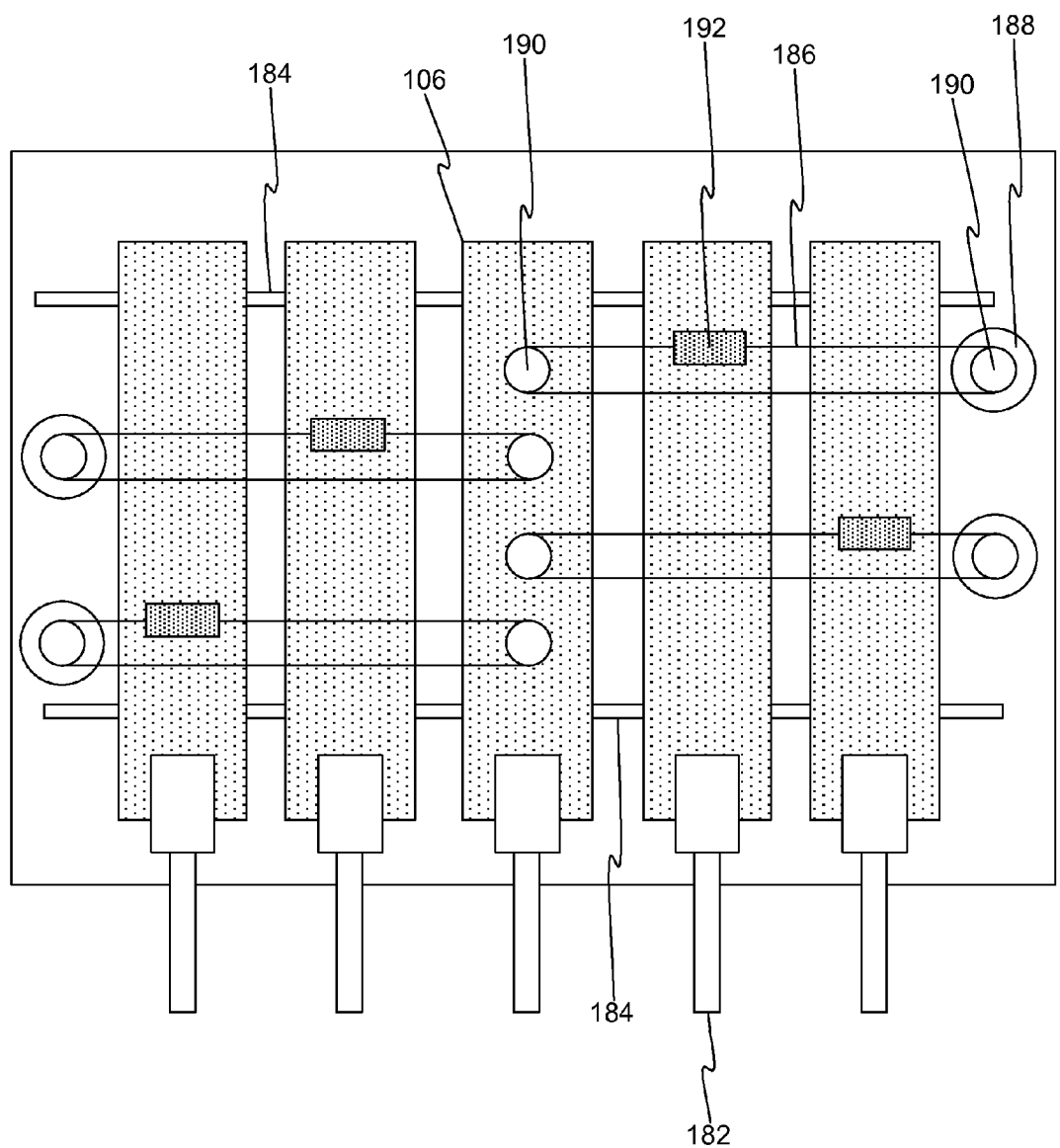
FIG. 6 shows a detailed view of robotic hands.

FIG. 6 shows a detailed view of robotic hands 102A, 102B. The robotic hand 102A, 102B has from two to five finger units 106. Each finger unit 106 may have a removable stylus or finger 182. One or more of the finger units 106 may be fixed, for example, central finger unit 106. The other finger units 106 may move laterally (left and right with respect to the figure) along rails 184. The lateral translation of the finger units may be accomplished by belts 186, which are driven by respective servos 188 and anchored between rotating units 190. In one embodiment, the belts 186 are timing belts, and the rotating units 190 are toothed cylinders to engage teeth of the timing belts. In other embodiments, the translational movement of the finger units 106 relative to the robotic hand 102A, 102B is driven by other mechanical means, such as pistons, rotating threaded shafts (ball gears), elastic loops and pulleys, etc. Control software, described further below, can monitor locations of finger units 106 and pending movement commands to prevent collisions between finger units 106.

In the embodiment shown in FIG. 6, it may be convenient for some of the rotating units 190 to be attached to the non-moving finger unit 190. Each paired belt 186 and finger unit 106 are attached by coupled by an attachment 192, for example, a clamp, a piece of metal affixed to both the belt 186 and the finger unit 106, a nut and bolt through the belt 186 and finger unit 106, etc. It can be seen from the design of FIG. 6 that finger units 106 (and consequently fingers 182) can be individually moved in a direction relative to the robotic hand 102A, 102B.

As will be described later, each finger unit 106 may have a pressure sensor 194 to measure pressure of the corresponding finger 182 on the touch device 104. Moreover, as describe next, each finger unit 106 may have a mechanism to move its corresponding finger 182 along the length of the finger unit 106 (i.e., perpendicular to the test surface 132). That is, if the test surface 132 is horizontally level, the fingers 182 may be individually moved up and down.

Figure 7:
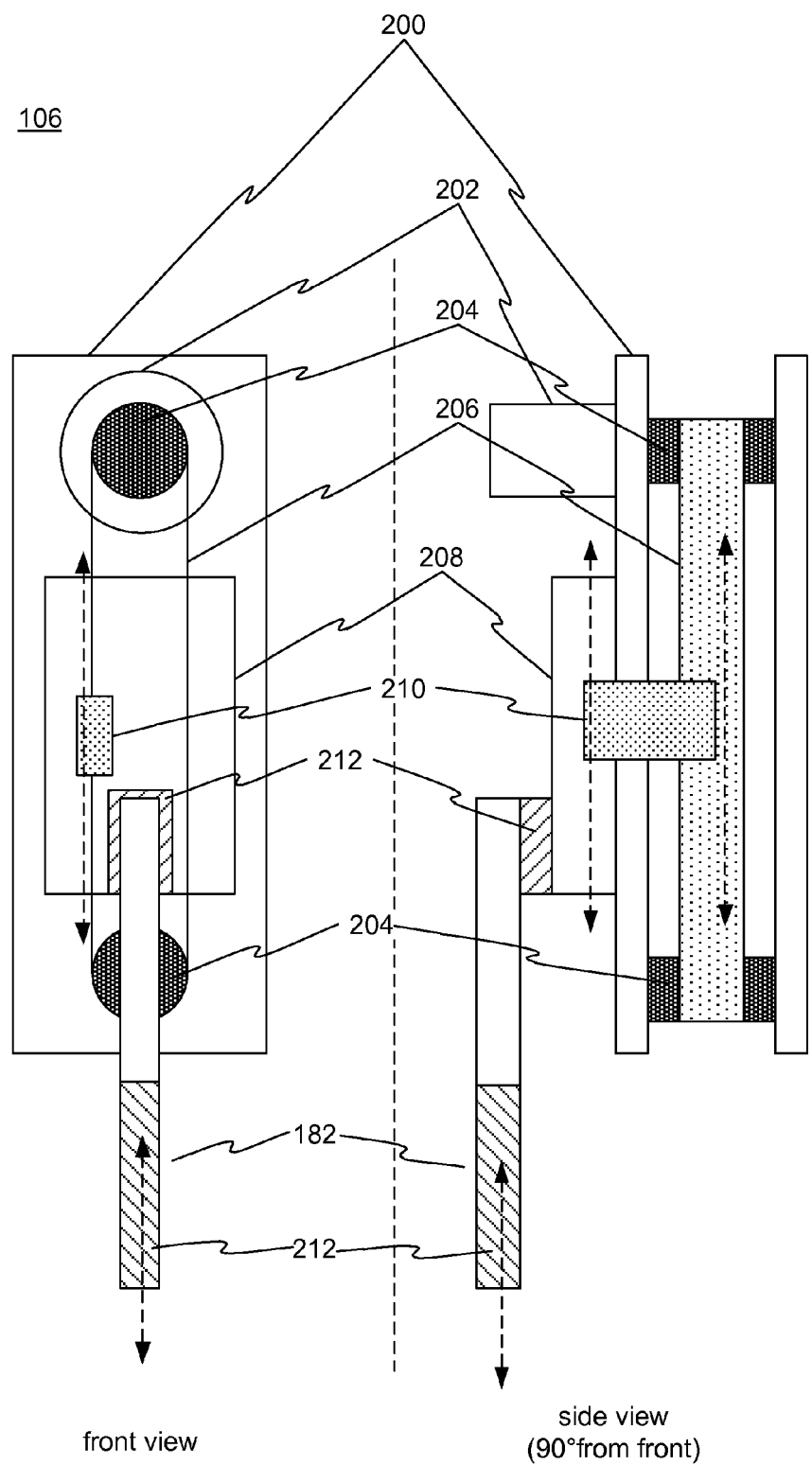
FIG. 7 shows detailed views of a moveable finger unit.

FIG. 7 shows detailed views of a moveable finger unit 106. The left view in FIG. 7 (front view), is perpendicular to the right view in FIG. 7 (side view). The finger unit 106 may have a main body 200, which may hold a finger servo 202 and finger wheels 204 around which turns a finger belt 206 driven by the finger servo 202. A carriage 208 may be moveably mounted on rails (not shown). The carriage 208 is attached to the finger belt 206 by an attachment 210 of any variety discussed earlier. In one embodiment, the attachment 210 may protrude and travel between two stoppers (not shown) on the carriage 208 to limit movement of the finger 182. Again, movement of finger 182 may be implemented by known means of robotic movement other than belts.

Each finger 182 may have a detachable tip 209, to allow use of different materials and shapes to contact the touch device 104. For example, a brass detachable tip 209 may be suitable for a capacitive type touch device 104. A silicon cover or detachable tip 209 may be called for when other types of touch devices 104 are to be tested.

In addition, each finger unit 106 may have a pressure sensor 212. It is assumed that the construction of the finger unit 106 allows the finger 182 to move with some degree of freedom, and the pressure sensor 212 is interposed between finger 182 and the carriage 208, thereby allowing the pressure sensor 212 to measure the pressure of the finger 182 contacting the touch device 104, due to force from the servo 202 and belt 206. In other words, the pressure sensor may measure pressure between the finger 182 and the carriage 208.

Figure 7A:
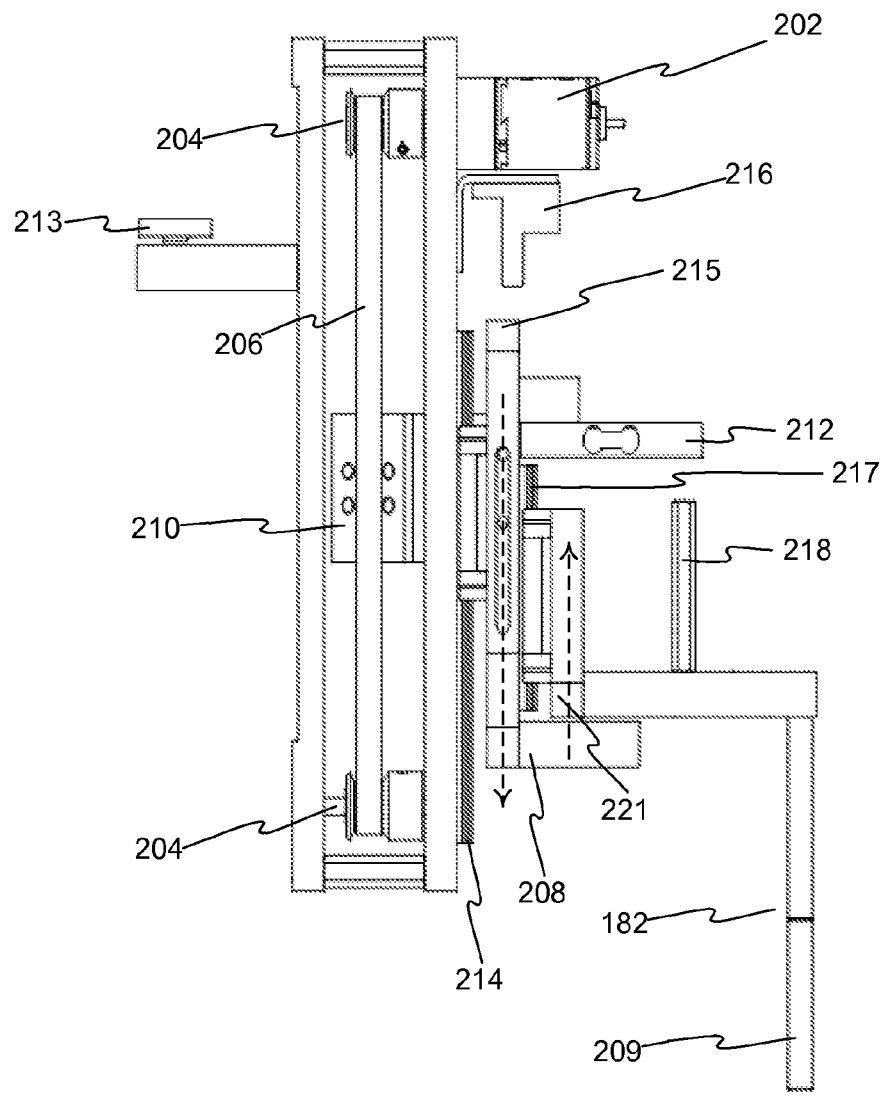
FIG. 7A shows a detailed view of a finger unit.

FIG. 7A shows a detailed view of a finger unit 106. In addition to features mentioned with reference to FIG. 7, also shown are a belt holder 213, for lateral movement via belt 186, and a rail 214, along which the finger unit 106 moves up and down. A sensor target object 215 and detector 216 function such that if the motor 202 drives the finger belt 206 upward, the detector 216 senses the sensor target object 215 and further movement is prevented. To measure pressure, when a detachable tip 209 is blocked by a surface such as a touch screen while the finger belt 206 is driving downward (depicted by downward arrow) along the rail 214, the tip 209 will move slightly upward along a second rail 217 (indicated by upward arrow) and then a load point 218 pushes a load cell 219 which can sense how much pressure is being applied by the load point 218. A spring 221 can be included to help the load point 218 push the load cell 219 with regular force.

Figure 8A:
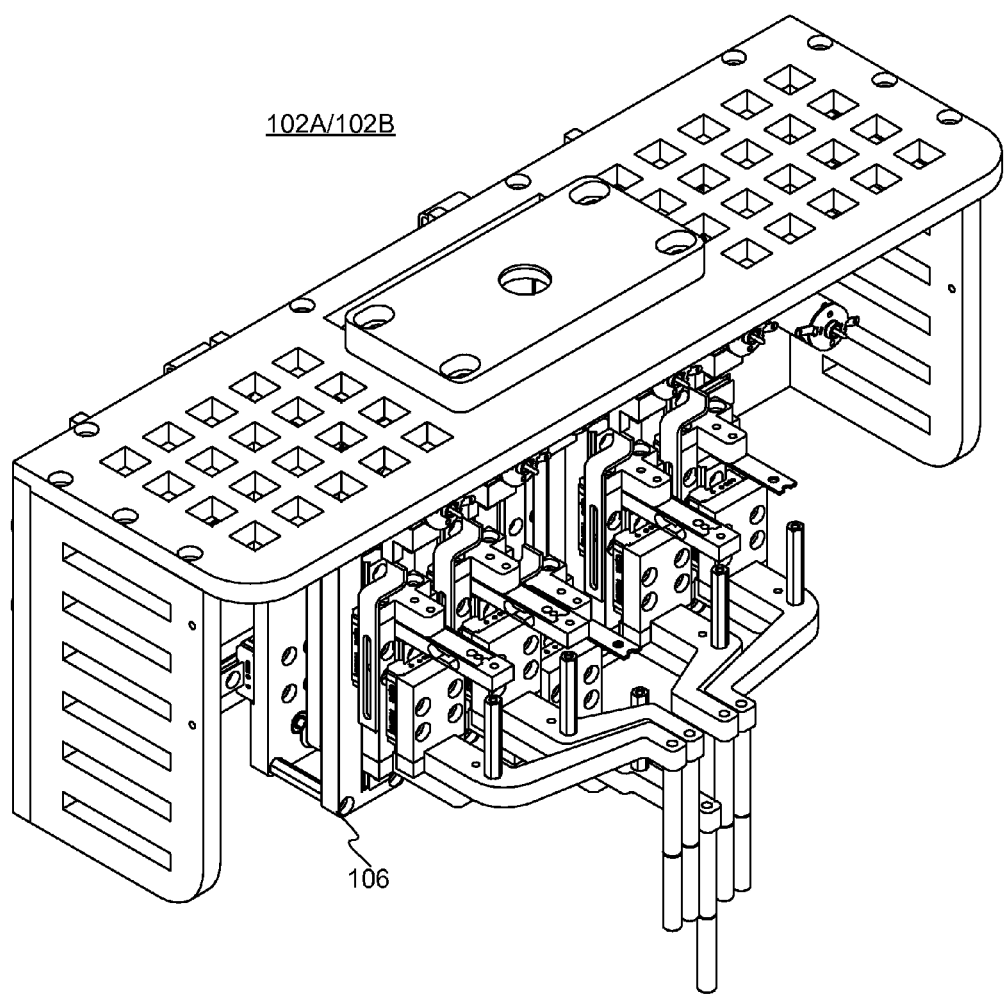
FIG. 8A shows a perspective view, off-center and from above, of a robotic hand.
Figure 8B:
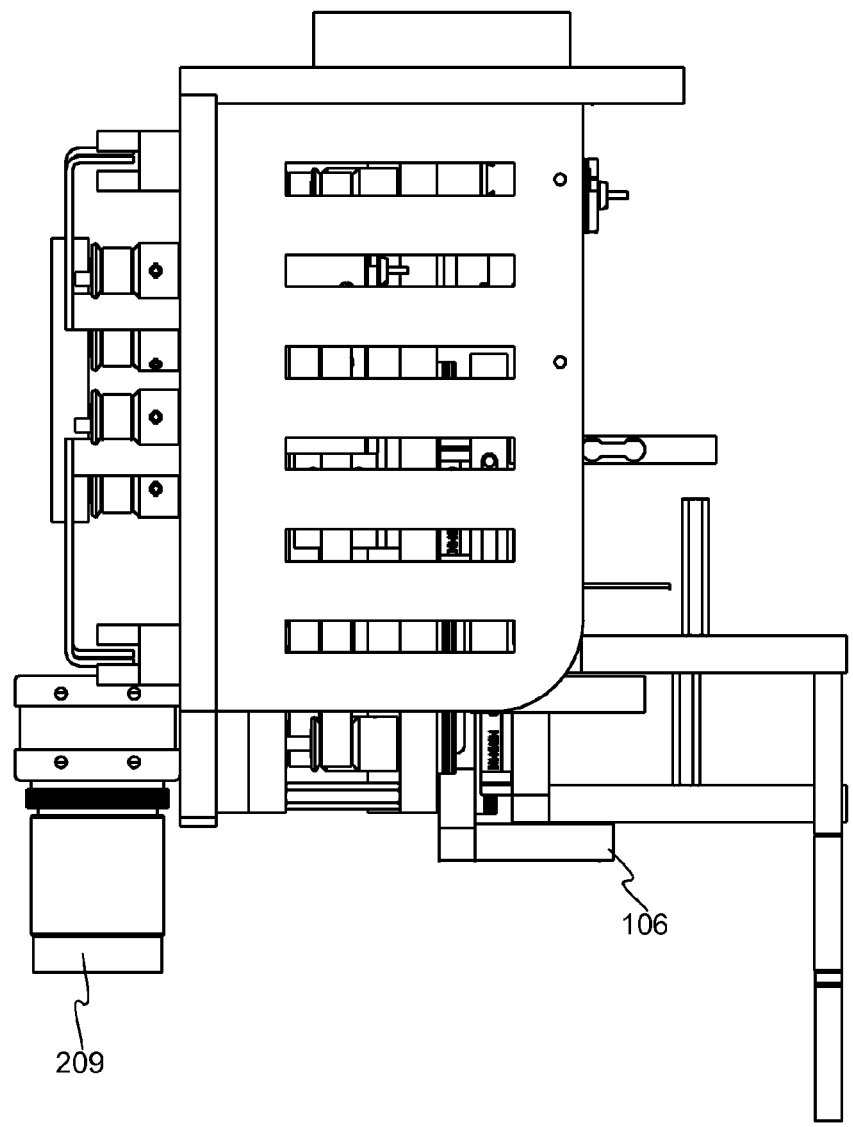
FIG. 8B shows a side view of a robotic hand.
Figure 8C:
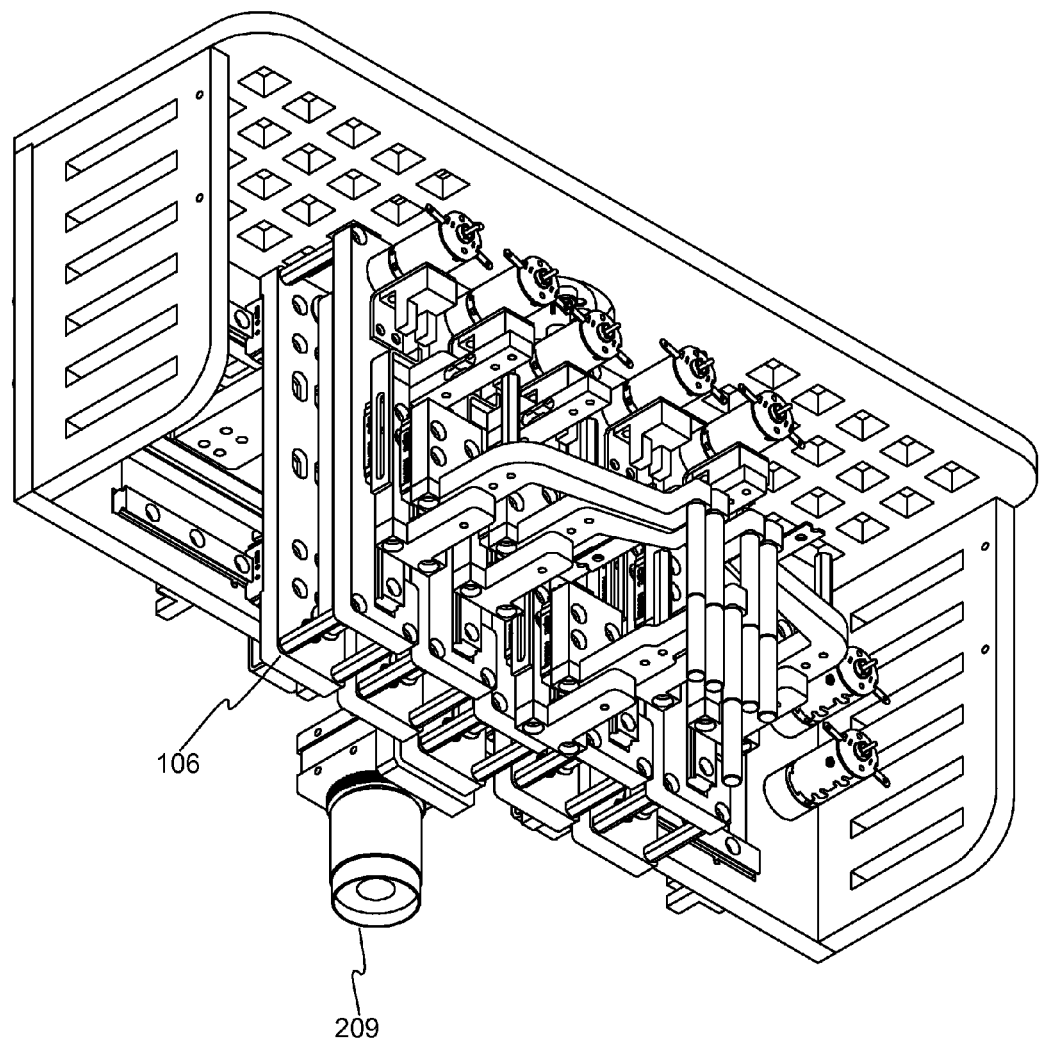
FIG. 8C shows a perspective view, off-center and from below, of a robotic hand.
Figure 8D:
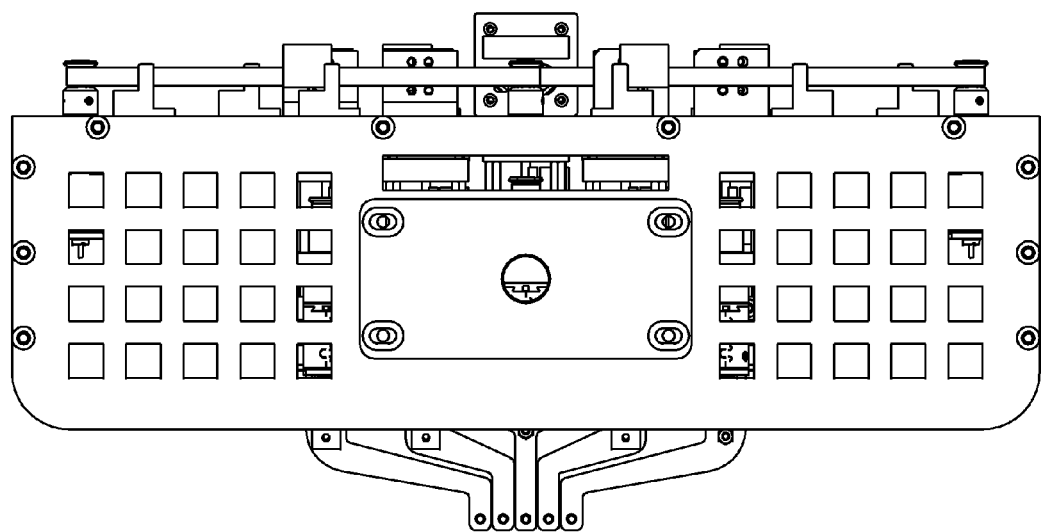
FIG. 8D shows a top view of a robotic hand.
Figure 8E:
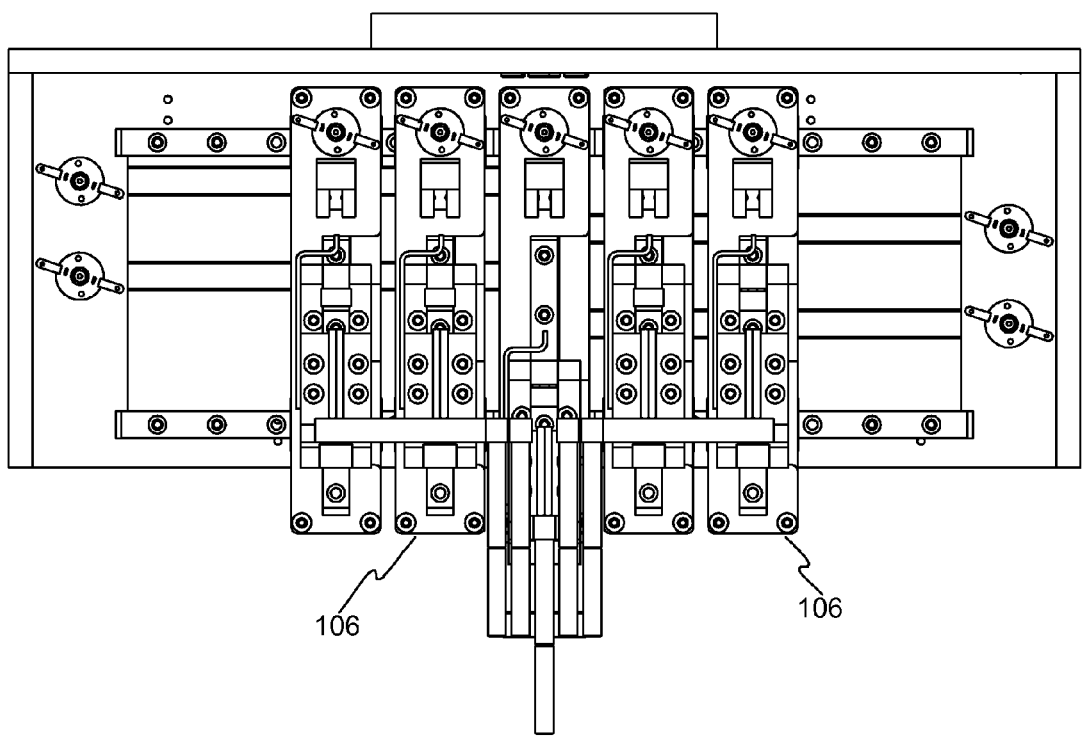
FIG. 8E shows a front view of a robotic hand.
Figure 8F:
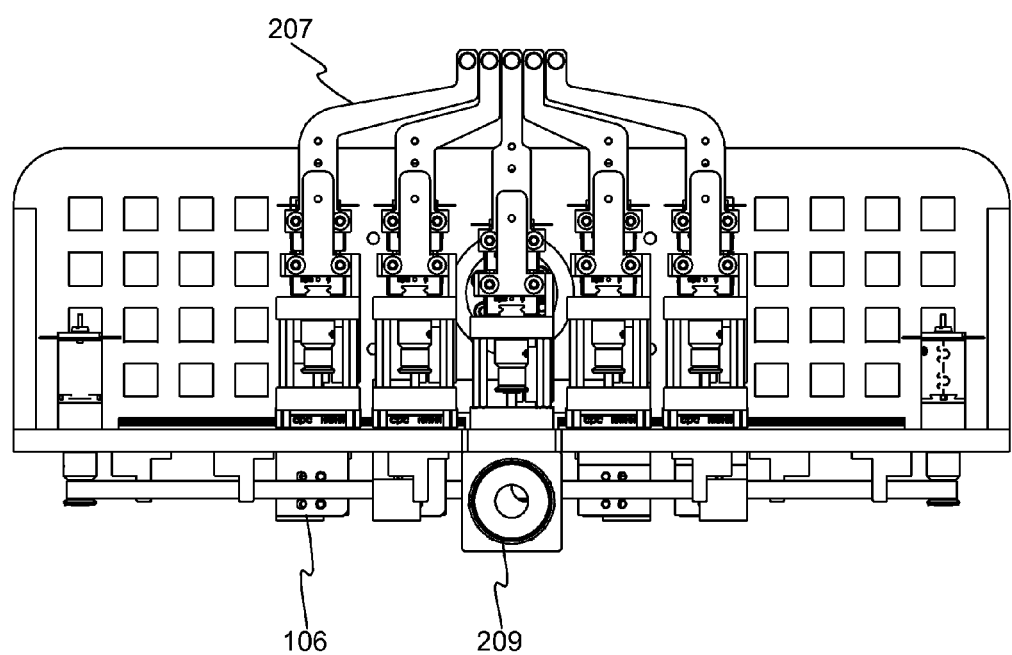
FIG. 8F shows a bottom view of a robotic hand.

FIG. 8A shows a perspective view, off-center and from above, of either robotic hand 102A, 102B. FIG. 8B shows a side view of either robotic hand 102A, 102B. An optional camera 209 may be included. FIG. 8C shows a perspective view, off-center and from below, of either robotic hand 102A, 102B. FIG. 8D shows a top view of either robotic hand 102A, 102B. FIG. 8E shows a front view of either robotic hand 102A, 102B. FIG. 8F shows a bottom view of either robotic hand 102A, 102B. It may be appreciated that the angled attachments 207 attaching fingers 182 to finger units 106 allow the fingers 182 to be placed close if not in contact with each other when the finger units 106 are positioned toward the center of the hand. This can allow a wide range of multi-touch gestures to be simulated.

The camera 209 can be helpful in performing an initial orientation process when the touch device 104 is to be tested. When the touch device 104 is in place for testing, a signal from the camera 209, which can be located based on the location of the corresponding robot hand, allows the robot to locate a test area boundary, such as the edges of a touch surface. For example, the camera signal allows the robot to place the hand at a corner of a test area boundary. The hand is then traced, guided by the camera signal, along the test area boundary to allow the location/coordinates of the boundary sides to be ascertained. In one embodiment, one hand starts at one corner, another hand starts the opposite corner, and the hands trace out respective halves of the test area or test surface boundary, and the trace path (boundary) is recorded. It may be sufficient to locate only corners and calculate the connecting boundary lines. In sum, a program such as MFStudio.exe 304 (discussed below) can implement a calibration process that finds the initial corner positions of a target touch screen for two XY Cartesian Robots and measures screen size and how well the target touch screen is aligned. This information can allow an operator to adjust the target touch screen calibration to the robot 130.

Figure 9:
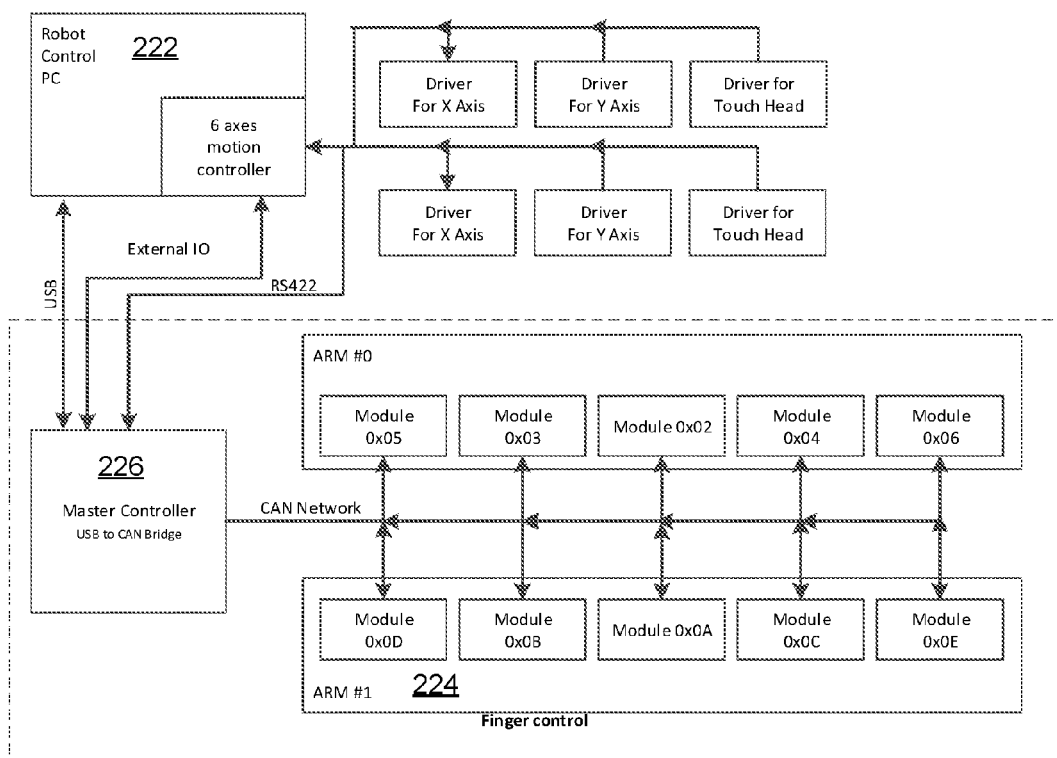
FIG. 9 shows a block diagram of control hardware.

FIG. 9 shows a block diagram of control hardware 220 for the various embodiments of the robot 130. The control hardware of the test robot 130 has two primary parts; a motion controller 222 and finger controller 224. Note that the term "MF" will be used as a synonym for "test robot" 130. The term "PC" will refer to a computer. Any components shown in FIGS. 9-13 not specifically discussed are self-explanatory according to their labels.

Regarding the motion controller 222, the motion controller 222 preferably uses PCI-motion controllers to control six AC servo motor AMPs, thereby providing Application Programming Interfaces (APIs) to drive six AC servo motors by programming languages such as C++, Visual Basic™, etc. The motion controller 222 may support up to six AC servo motor AMPs, but uses six channels to drive the X-Y Cartesian robot 134, and the two robotic hands 102A, 102B.

Figure 10:
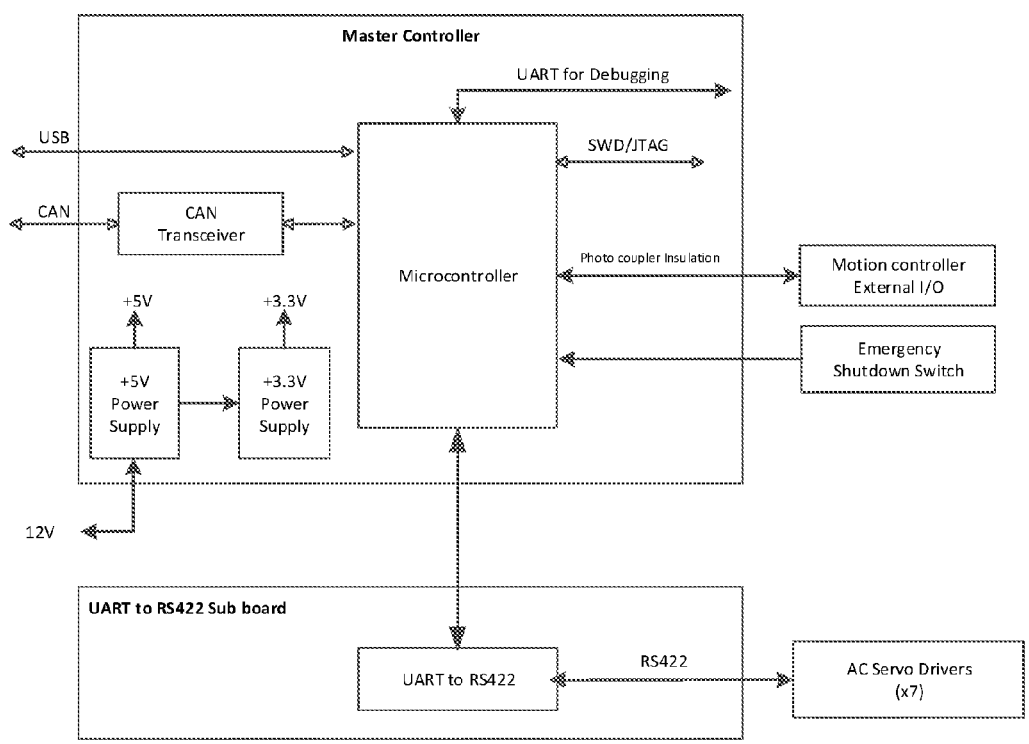
FIG. 10 shows a block diagram of a master controller.

FIG. 10 shows a block diagram of a master controller 226. Primarily, the master controller 226 acts as a UART-CAN bridge (Universal Asynchronous Receiver/Transmitter, Controller Area Network) to bypass data packets from the motion controller 222 (PC) on a serial UART to the finger modules 240 (see FIG. 11) on a CAN network. Also, the master controller 226 exposes external inputs and outputs to connect other devices (e.g., the motion controller 222). It may be helpful for the external inputs and outputs to trigger complex, subsequent operations with minimal delay time.

Figure 11:
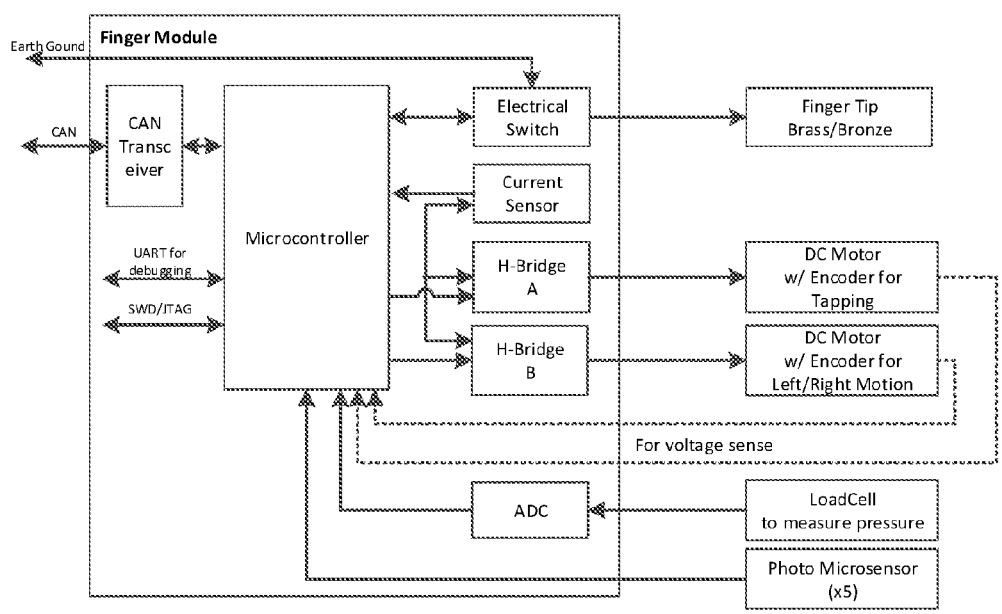
FIG. 11 shows a block diagram of a finger module.

FIG. 11 shows a block diagram of a finger module 240. Finger module 240 controls two DC motors and measures the currents and voltages of each motor, as well as the pressure of one loadcell (e.g., pressure sensor 212). Each of ten modules on the same CAN network have unique respective address IDs. Thus, an operator can control the movement of each finger unit 106. Particularly, the circuit and firmware have several protection features that measure a drive motor's current temperature and voltage in real time.

Figure 12:
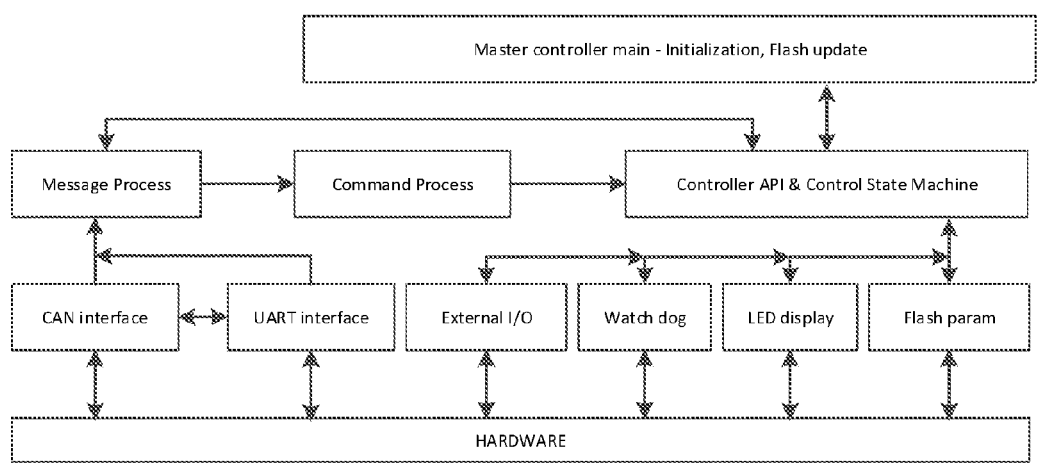
FIG. 12 shows a firmware architecture for the master controller.

FIG. 12 shows a firmware architecture 260 for the master controller 226. The master controller 226 has a device initialization (interrupt vector tables, watch dogs, and so forth) and also includes codes which allow updating of flash memory via the network. A Message Process and Command Process may define main protocols to control the finger units 106. A Controller API & Control state machine provide an abstraction layer to invoke driver functions by the Command Process routines. Moreover, this state machine manages and processes the requests from other devices, such as the master controller 226 PC and the finger modules 240. A CAN interface and UART Interface are responsible for UART-CAN bridging and therefore, if packets from the motion controller 222 (control PC) are not destined for the master controller 226, then they are bypassed to the finger modules 240. Regarding External I/O, the master controller 226 provides external inputs and external outputs to interact with other devices.

Figure 13:
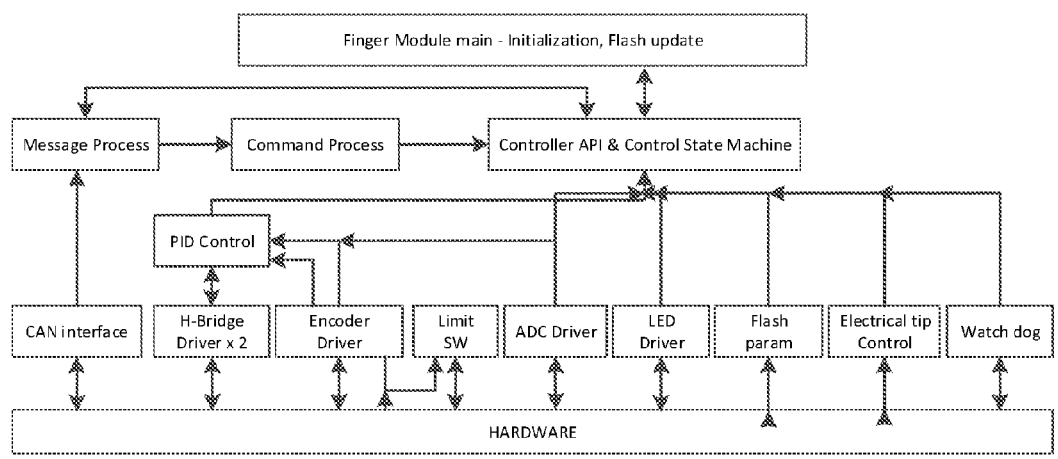
FIG. 13 shows a firmware architecture for a finger module.

FIG. 13 shows a firmware architecture 280 for a finger module 240. A Controller API & Control State Machine provides an abstraction layer for invocation of driver functions by Command Process routines. This State Machine manages and processes all of the requests from other devices, such as the control PC and the finger modules 240. A PID (Proportional-Integral-Derivative) Controller drives DC motors with feedbacks, as the test robot 130 includes cascade PID routines for position, speed, and pressure control. An H-Bridge driver has one module that includes two HBridge ICs (integrated circuits) to control two DC motors; i.e., this component is a driver to support the DC motors. The microcontroller includes quadrature encoder counters and PWM (Pulse Width Modulation) generator to control DC motors. A Limit Switch may be provided because when a motor or servo runs, the controller should know the start and end limits to prevent collisions. An ADC Driver reads the acquisition data including temperature, current, voltage, and pressure (loadcell). The ADC Driver also includes a software filter, like Low Pass Filter and Moving Average Filter, to compensate ADC output. An electrical switch can change the electrical state of a finger tip for a capacitive-type touch device. A finger tip is connected to GND, and the operator can change the finger's electrical state from GND to Floating or vice versa.

Figure 14:
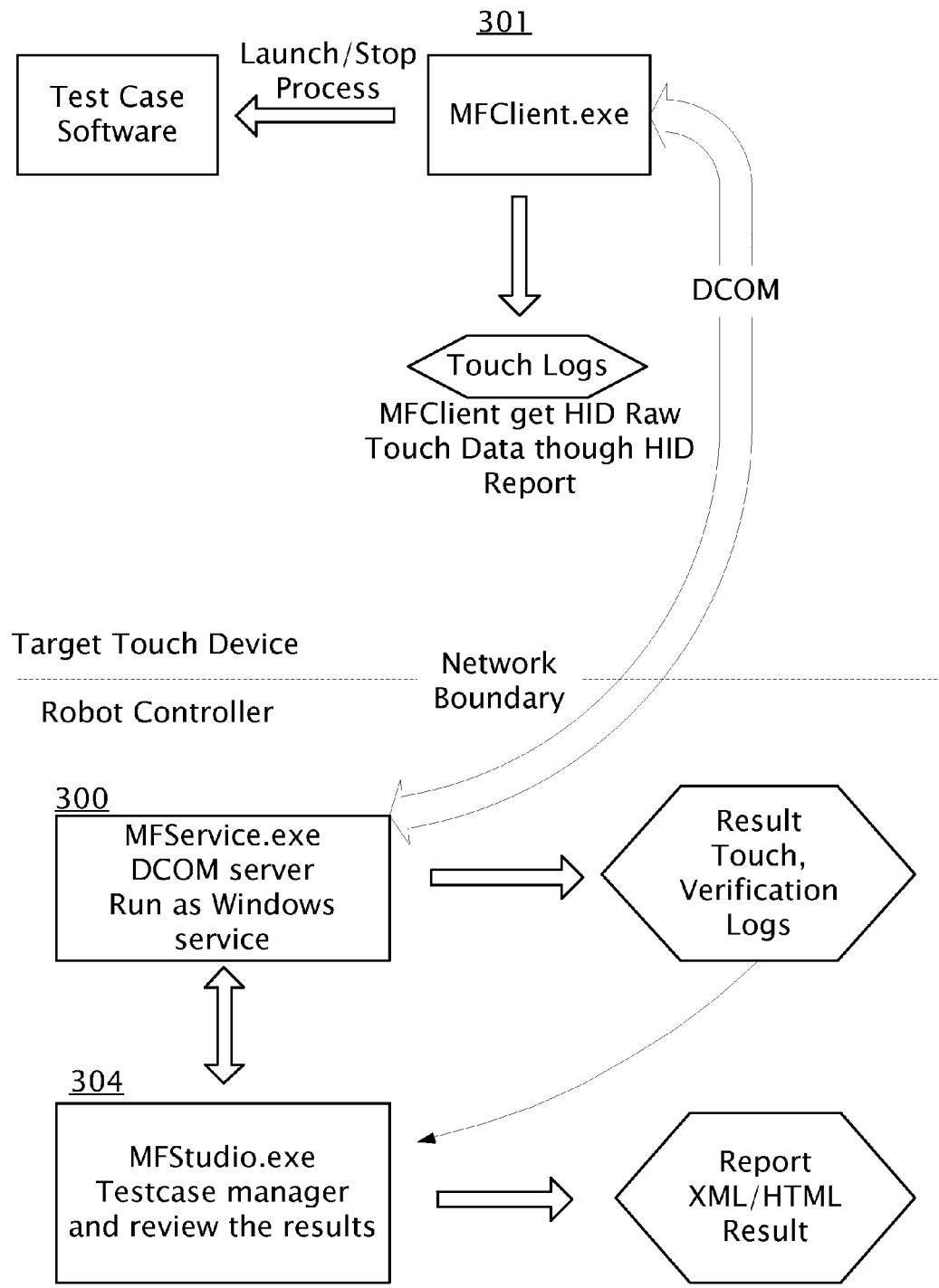
FIG. 14 shows a test framework architecture.

FIG. 14 shows a test framework architecture. A DCOM (Distributed COM) server 300 (MFService.exe) is an operating system based background process that monitors the movement of the test robot 130 and protects against unexpected collision of robot arms. The DCOM server 300 monitors the positions of the test robot 130 from the AC motor AMPs and from the finger controllers. The monitoring DCOM server 300 also initializes the configuration of the motion controller with data that would likely result in unexpected accidents. In addition, the DCOM server 300 is responsible for controlling the X-Y Cartesian robot 134 and finger units 106, and is also responsible for logging/verifying actual results and expected results. Thus, the DCOM server 300 may be considered the core of the test software framework. In addition to this function, the DCOM server 300 provides a COM API through a TCP/IP socket with the target touch device 104 (specifically, an MFClient.exe 301 application) to transfer touch raw data such as pressure data from the touch device 104.

A management tool MFStudio.exe 304 can provide test case execution/reviewer UI (user interface), dash board for the status of the robot, and target touch device calibration process. The management tool can create/run/verify the test case jobs and generate the reports of each test case. The management tool is also responsible for providing configuration data, status information, and manual control of the test robot 130; the X-Y Cartesian robot 134, the robotic hands 102A, 102B, and the finger units 106.

The client application MFClient.exe 301 manages each test case to be invoked by MFStudio.exe 304 when the connection is available. The client application MFClient.exe 301 is also responsible for capturing Raw touch HID (Human Interface Device) information, which can be facilitated with HID class drivers, which provide an interface for extracting data from raw HID reports. The class drivers supply a report descriptor that details the format of the different reports that it creates. Therefore, the client application MFClient.exe 301 captures these raw reports and then copies them into the robot controller (server).

The invention claimed is:

1. A robot for testing touch-sensitive displays, the robot comprising:
   a test surface configured to hold a touch-sensitive display; and
   a robotic unit through which an axis of rotation passes, the robotic unit configured to rotate about the axis of rotation, the axis of rotation fixed relative to the first robotic unit, the first robotic unit also able to translate in two dimensions within a plane parallel to the test surface, the robotic unit comprising:
      a first finger unit and a second finger unit, both finger units directly or indirectly secured to the robotic unit and configured to contact the touch-sensitive display,
      a linear track fixed relative to the robotic unit, wherein the first finger unit is moveably attached to the linear track and is configured to move along the linear track on a portion of a line that is parallel to the linear track, the line having a point thereon that intersects either the axis of rotation or a radius thereof, wherein the first finger unit and the second finger unit are arranged on the line with the point between them, each figure unit configured to individually translate relative to and perpendicularly to the line, wherein the linear track is fixed relative to the robotic unit, and wherein the line is not a radius of the axis of rotation; and
   a control unit configured to receive and implement instructions to move the finger units relative to the touch-sensitive display by controlling: translation of the robotic unit within the plane parallel to the test surface, rotation of the robotic unit about the axis, translation of the first finger unit along the portion of the line and relative to the robotic unit, translation of the first finger unit perpendicular to the line and relative to the robotic unit, and translation of the second finger unit perpendicular to the line and relative to the robotic unit.

2. The robot according to claim 1, wherein at least one of the finger units translates in only the two dimensions relative to the first robotic unit.

3. The robot according to claim 1, further comprising a linear translator that translates the first robotic unit, and a second linear translator that translates the first linear translator.

4. The robot according to claim 1, wherein the second finger unit is moveably attached to the linear track.

5. The robot according to claim 1, wherein the linear track comprises a rail, and wherein the robotic unit further comprises a linear actuator configured to move the first finger unit along the linear track.

6. The robot according to claim 1, wherein the first and second finger units are arranged to individually translate in a direction perpendicular to the test surface.

7. The robot according to claim 1, wherein the line is substantially perpendicular to the radius of the axis of rotation.

8. The robot according to claim 1, further comprising a third finger unit directly or indirectly secured to the robotic unit, the third finger unit arranged on the line between the first and second finger units, the third finger unit unable to translate relative to the robotic unit along the line, the third finger unit arranged to translate relative to the robotic unit perpendicular to the linear track, the robotic unit securing a first linear actuator configured to actuate the first finger unit and securing a second linear actuator configured to actuate the second finger unit.

9. The robot according to claim 1, wherein each finger unit comprises a respective arm comprising a tip, wherein a distance between the tips is always less than a distance between the finger units.

10. A robot for testing touch-sensitive displays, the robot comprising:
   a translation unit configured to translate a rotation unit and a hand unit in directions parallel to a reference plane, the rotation unit comprising a servo configured to rotate the hand unit about an axis of rotation that passes through the first hand unit; and
   the hand unit, wherein the hand unit comprises:
      a first finger unit and a second finger unit,
      a first linear track portion and a second linear track portion that are both on a same line and are arranged to translate in unison with translation of the hand unit by the translation unit and rotate in unison with rotation of the hand unit by the rotation unit, the line having a first portion, a second portion, and a point therebetween, wherein the point intersects the axis of rotation or a radius thereof, and
      the first finger unit moveably attached to the first linear track portion and the second finger unit moveably attached to the second linear track portion, the first finger unit configured to linearly translate relative to the hand unit by moving along at least the first track portion and within the first line portion, the second finger unit configured to linearly translate relative to the hand unit by moving along at least the second linear track portion and within the second line portion, and wherein the first finger unit and the second finger unit are each configured to individually translate relatively and perpendicularly to the line toward and away from a touch-sensitive display to engage and disengage contacting the touch-sensitive display; and a control unit coupled with the translation unit, the servo, the hand unit, and the finger units, and further configured to signal the: hand unit to translate, the servo to rotate, the first finger unit to translate along the first track portion, the second finger unit to translate along the second track portion, and translate the finger units perpendicularly to the line to engage and disengage contacting the touch-sensitive display.

11. The robot according to claim 10, wherein the hand unit is rotatably attached to the translation unit such that the hand unit rotates in a plane parallel to the reference plane, and when the hand unit rotates the first and second finger units translate in curved paths that are parallel to the reference plane.

12. The robot according to claim 10, the hand unit further comprising a track comprised of the first and second track portions.

13. The robot according to claim 12, wherein the track comprises a single rail.

14. A robot to test touch-sensitive surfaces, the robot comprising:

a head unit that translates in directions parallel to a test surface, the test surface comprising a holding mechanism to hold a touch-sensitive surface relative to the robot;

the head unit comprising a first servo and two finger units, the two finger units movably secured to the head unit, wherein one of the finger units is constrained to be moved by the first servo, relative to the head unit, along a linear mechanical path, wherein the linear mechanical path is parallel to the surface, is fixed relative to the head unit, and is substantially perpendicular to a radius originating from an axis of rotation of the head unit, wherein the finger units are configured to translate at least along respective portions of the linear mechanical path, and wherein the portions are separated by the axis or the radius, and wherein the finger units comprise respective tips for contacting the touch-sensitive surface;

a second servo to move at least one of the finger units perpendicular to the linear mechanical path, wherein the head unit is rotatably mounted at the axis of rotation such that the linear path and the finger units rotate together about the axis of rotation in correspondence with rotation of the head unit about the axis of rotation; and a control unit coupled with the servos and the finger units, and configured to implement instructions to rotate the head unit, translate the finger units along portions of the mechanical path, and translate the at least one of the finger units perpendicular to the mechanical path.

15. The robot according to claim 14, wherein the first servo moves the corresponding finger unit along the linear path by moving a belt attached to the corresponding finger unit.

16. The robot according to claim 14, wherein the second servo moves at least one of the finger units perpendicular to the test surface.

* * * * *